United States Patent [19]

Behr

[11] 4,244,182
[45] Jan. 13, 1981

[54] APPARATUS FOR CONTROLLING REFRIGERANT FEED RATE IN A REFRIGERATION SYSTEM

[75] Inventor: Joseph L. Behr, Des Peres, Mo.
[73] Assignee: Emerson Electric Co., St. Louis, Mo.
[21] Appl. No.: 862,445
[22] Filed: Dec. 20, 1977
[51] Int. Cl.³ .................. F25B 41/00; F25B 41/04
[52] U.S. Cl. ........................... 62/211; 62/223; 62/224
[58] Field of Search ............... 62/223, 211, 225, 209

[56] References Cited
U.S. PATENT DOCUMENTS

| | | | |
|---|---|---|---|
| 2,112,344 | 3/1938 | Otto | 236/91 |
| 2,400,335 | 5/1946 | Dobson | 62/4 |
| 3,537,272 | 11/1970 | Hales et al. | 62/157 |

*Primary Examiner*—William E. Wayner
*Assistant Examiner*—Harry B. Tanner
*Attorney, Agent, or Firm*—Polster, Polster and Lucchesi

[57] ABSTRACT

A method and apparatus for controlling the operation of a refrigeration system, for example, is provided which includes a first sensor for monitoring the sump temperature of a compressor used in conjunction with the refrigeration system, and a second sensor which monitors compressor ambient air temperature. The refrigeration system includes an electrically operable expansion valve and the sensors are employed in a control device operatively connected to the electrically controlled expansion valve to control the operating position of that valve. Refrigeration system operation can be controlled precisely, thereby maximizing the efficiency of the system, by monitoring the sump temperature and ambient temperature of the compressor.

10 Claims, 5 Drawing Figures

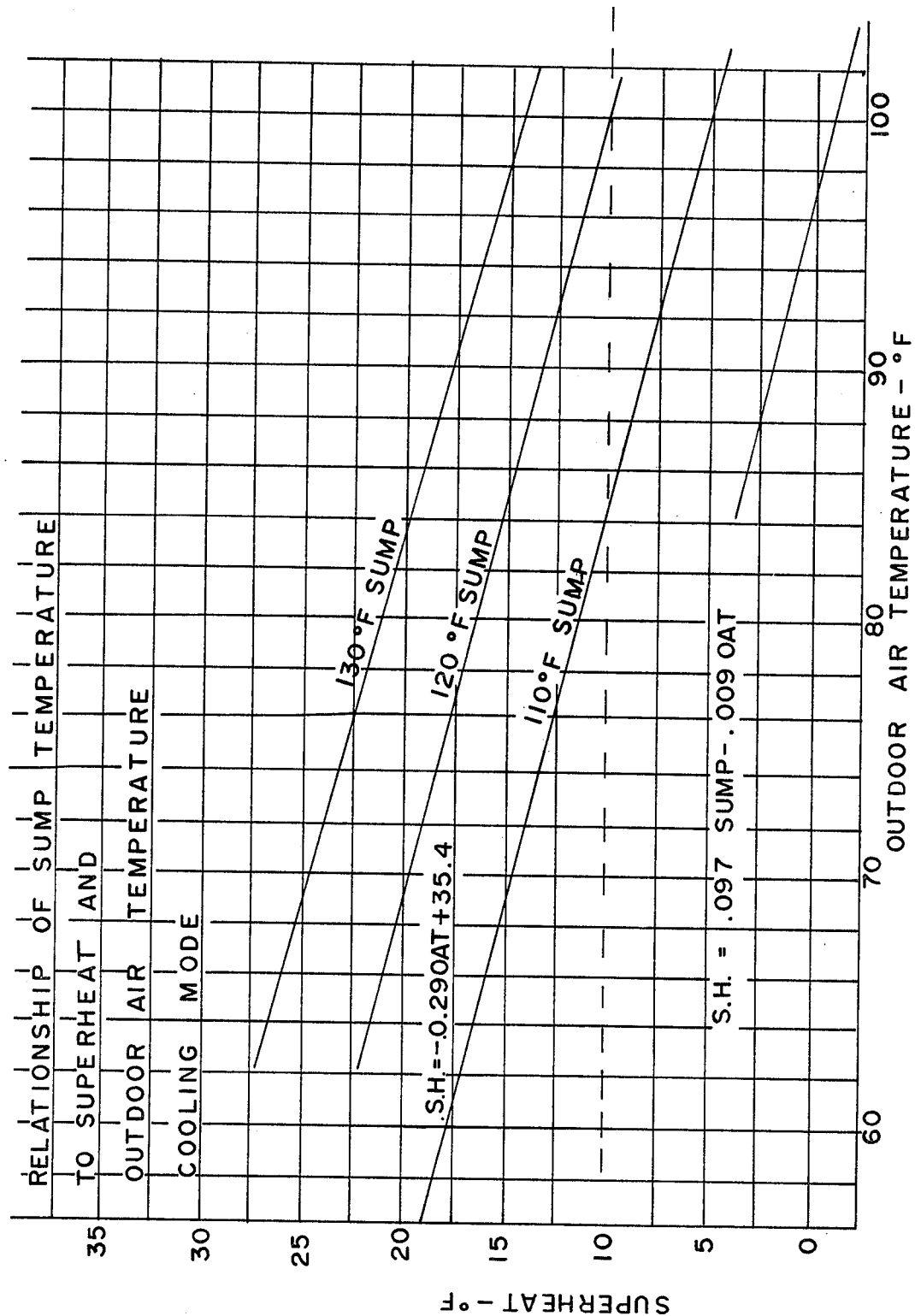

APPARATUS FOR CONTROLLING REFRIGERANT FEED RATE IN A REFRIGERATION SYSTEM

BACKGROUND OF THE INVENTION

This invention relates to refrigeration systems, and in particular, to a method and apparatus for obtaining the maximum efficiency from a refrigeration system. While the invention is described in detail with respect to conventional air conditioning systems, those skilled in the art will recognize the wider applicability of the invention disclosed hereinafter. The invention may find additional use, for example, with heat pumps, refrigeration systems, or other applications where system efficiency may be improved by monitoring specific parameters affecting that efficiency.

The operational components of a conventional air conditioning system are well known in the art. In general, such systems include a compressor which forces the particular refrigerant used in the system through a condensing coil, and then through an expansion valve into an evaporator coil. The refrigerant is sent back to the suction side of the compressor from the evaporator coil, after which the cycle is repeated. The expansion valve plays an important part of the overall efficiency exhibited by the system. Under ideal operating conditions, the expansion valve should admit an amount of refrigerant that can be evaporated or slightly superheated in the evaporator coil. That is to say, the evaporator coil should be wetted along approximately its entire length to provide good heat transfer rate and maximum refrigeration system efficiency. In the past, some portion of the evaporator coil always has been dry. A dry evaporator coil portion was utilized in order to prevent the passage of liquid to the suction side of the compressor. Liquid entering the suction side of the compressor causes damage to the compressor valves. Consequently, it is the prevalent practice to design refrigeration systems with a safety margin so that the coil is operating at its most efficient point at light load conditions. That is to say, with light load conditions, the maximum coil length is available for heat transfer. However, as load increases, the length of the coil available for effective heat transfer decreases so that heavy load conditions represent the least efficient operating area of the refrigeration system.

Thermostatic control valves presently are the most prevalent means for controlling the operation of refrigeration systems. Thermostatic control valves generally include a diaphragm actuated valve member having one side of the diaphragm operatively connected to a pressure generating means. The pressure generating means conventionally is a sealed sensor having a gas responsive to temperature enclosed in it. The opposite side of the diaphragm is opposed by system pressure and the diaphragm is preloaded by means of a spring to set the operating point of the valve. Pressure changes in the gas of the sensor, in response to changes in temperature, operate the valve. While these devices work well for their intended purposes, the thermostatic expansion valve can not adequately improve system efficiency by assuring full utilization of the refrigeration coil, because a comparatively small system gain must be used to maintain system stability.

Thermostatic expansion valves also suffer an additional disadvantage in heat pump applications. As will be appreciated, a heat pump, for explanational purposes, may be considered a reverse cycle refrigeration system. Consequently, two thermostatic expansion valves must be used, since a different adjustment of the valves normally is required for each coil. Thermostatic expansion valves also generally control flow only in one direction through the valve and since heat pumps generally reverse fluid flow through the evaporator and condenser coils, an additional valve is required in heat pump applications. Such duplication results in increased cost.

A number of devices are known in the art which function to improve the efficiency of air conditioning or heat pump systems. One particular advantageous system is shown and disclosed in the co-pending application by Behr, Ser. No. 720,698, now U.S. Pat. No. 4,067,203 ('203). In '203, a single function of the system is monitored, and that system variable is used to control system operation. Another method of controlling an evaporator system is shown in a co-pending application by Behr, Ser. No. 862,446, filed Dec. 20, 1977, and assigned to the assignee of the present invention. The last mentioned Behr application monitors pressure and temperature of the refrigerant used in the refrigeration system to control position of the expansion valve.

Each of the related inventions discussed above are intended to increase the efficiency of refrigeration systems. However, each operates under different theories of operation and are structurally distinct from one another.

It has been recognized for many years in the refrigeration industry that the flow control valve or expansion device should feed fluid to the evaporator coil at such a rate that a nominal superheat is maintained at the evaporator outlet. This, in turn, results in a superheat level being maintained at the compressor suction. Consequently, the compressor is protected from damage caused either by overfeeding (flooding) or under feeding (starving) refrigerant fluid conditions. It also is known that compressor sump temperature is related to the flow rate and superheat level of the refrigerant. I have found that compressor sump temperature is very sensitive and fast to respond either to flooding or to starving refrigerant fluid conditions. Compressor manufacturers desire to maintain the sump temperature between safe upper and lower temperature limits to ensure proper operation of the compressor. However, due to the nature of mechanical expansion valves of the type described above, which attempt to hold a constant superheat, the sump temperature rises and falls with ambient temperature on the compressor and the evaporator coil, the evaporator coil being the outdoor coil in the heating mode of heat pump systems.

The invention disclosed hereinafter provides excellent steady state and transient control of superheat at the suction side of a compressor, which control is maintained by using the combination of a sump temperature electrical signal modified by an outdoor air temperature electrical signal. For example, a system superheat setting of 2 degrees to 5 degrees F. at the suction side of a compressor can be held over all operating conditions of the refrigeration system by means of the invention disclosed hereinafter, thus guaranteeing a full wetted evaporator coil, high system operating capacity and high efficiency operation.

One of the objects of this invention is to provide an improved means for controlling the refrigeration cycle of a refrigeration system.

Another object of this invention is to provide a method for operating the refrigeration system in which superheat of the system is monitored through sump temperature of the compressor.

Another object of this invention is to provide a refrigeration system which permits the operation of the evaporator coil in a wetted state of operation.

Other objects of this invention will be apparent to those skilled in the art in light of the following description and accompanying drawings.

SUMMARY OF THE INVENTION

In accordance with this invention, generally stated, a refrigeration system is provided with means for controlling the operation of that system based upon a control system which monitors the sump temperature of the compressor used in the system. Because the compressor generally, but not always, is located externally of the building employing the refrigeration system, an outdoor temperature or compressor ambient temperature is also monitored, which is used to modify the sump temperature signal. The sump temperature and outdoor temperature signals are used to operate an electrically operable expansion valve. Operation of the expansion valve modifies fluid flow in the refrigeration system to maintain a desired operating point.

BRIEF DESCRIPTION OF THE DRAWINGS

In the drawings.

FIG. 4 is a graph illustrating the relationship of sump temperature to superheat and outdoor air temperature in the cooling mode of a heat pump device.

DESCRIPTION OF THE PREFERRED EMBODIMENT

Figure 1:
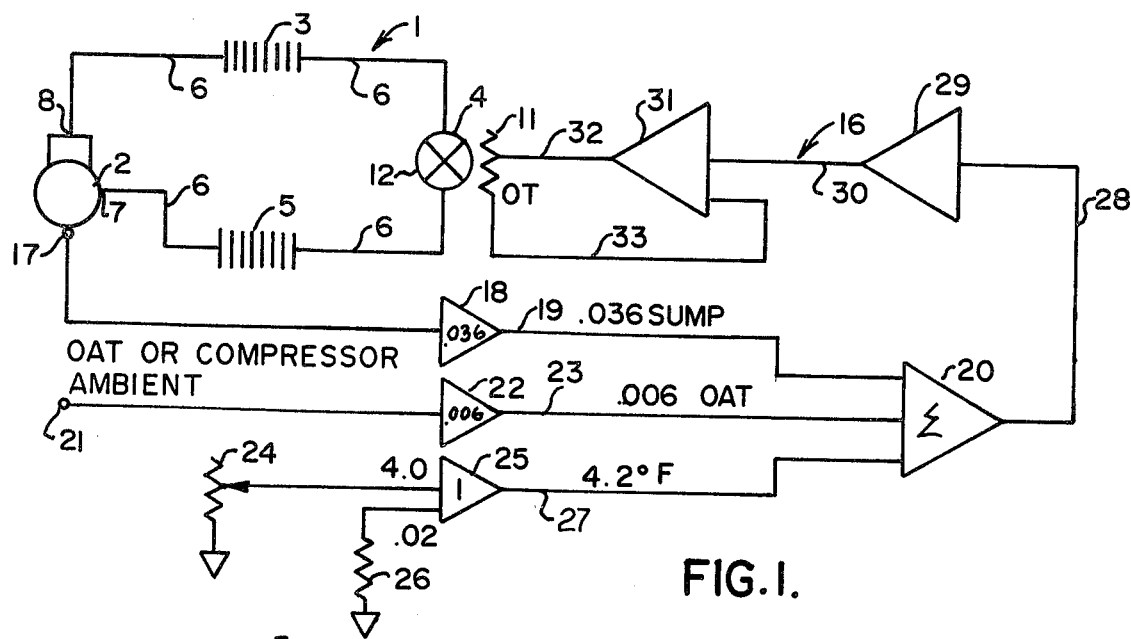
FIG. 1 is a diagrammatic representation of one illustrative embodiment of control system of this invention.

Referring now to FIG. 1, reference numeral 1 indicates a conventional refrigeration system with which the invention disclosed hereinafter finds application. The system 1 may be a conventional air conditioning system, heat pump or refrigeration unit, for example. In general, the system 1 includes a compressor 2, a condenser coil 3, an expansion valve 4, and an evaporator 5, all of which are serially interconnected with one another by a refrigerant line 6.

The compressor 2 generally has a suction side 7 connected to the evaporator coil 5 and has a pressure side 8, connected to the condenser coil 3. Refrigerant vapors drawn from the evaporator coil by the compressor are forced into the condensor coil, where the vapor liquifies. The liquid refrigerant then is returned to the evaporator coil through the expansion valve. The expansion valve converts the refrigerant from a high pressure liquid to a low pressure vapor plus liquid by passing the refrigerant through a restriction in the valve. Control of refrigerant input to the evaporator can be maintained by inserting a valve member in the restriction of the expansion valve and adjusting the valve member in response to some predetermined variable. Passage of the refrigerant through the expansion valve can be varied over a considerable range of fluid conditions. For example, the position of the expansion valve can be varied so that greater or smaller amounts of liquid enter the coil 5. That is to say, a "wetted" fluid may be passed through the coil 5, which converts to its gaseous form upon the absorption of heat. However, all fluid entering the input side of the coil 5 from the valve 4 must be in a gaseous state when the fluid reaches the compressor 2, in order to prevent damage to the valves of the compressor.

As previously indicated, thermostatic expansion valves commonly are used for the expansion valve 4. Such valves are known to be relatively inefficient in operation, and to overcome that inefficiency, electrically operable valves have been devised. A valve particularly well adapted for use with the invention disclosed herein is described in U.S. Patent to Kunz, U.S. Pat. No. 3,967,781. The electrically operatively operated valve disclosed in Kunz includes a heater means 11 operatively associated with a valve member 12 so that the application of electrical energy to the heater means 11 causes the valve member 12 to change positions. The expansion valve 4 is diagrammatically illustrated in the drawings, and elements of the valve disclosed in the Kunz Patent, not repeated here, are intended to be incorporated by reference.

It has been recognized for many years in the industry, that a balance between efficient evaporator coil operation and protection of the compressor from damage, either because of flooding or because of starving conditions in the refrigerant fluid flow to the compressor, can be obtained when the expansion valve feeds fluid to the evaporator coil at such a rate that a nominal superheat is maintained at the evaporator outlet. This, in turn, necessarily means that a superheat level is maintained at the suction side 7 of the compressor 2. It also is known that compressor sump temperature is related to the flow rate and the superheat level of the refrigerant, sump temperature being very sensitive and fast to respond to either flooding or starving refrigerant conditions. Compressor manufacturers want to maintain the sump temperature between safe upper and lower temperature limits. However, due to the nature of control of mechanical expansion valves, which attempt to hold a constant superheat, the sump temperature will rise and fall with changes in the ambient temperature of the compressor and of the condenser or outdoor coil. I have found that a unique relationship exists between compressor suction superheat, sump temperature and outdoor or ambient air temperature, which can be used to advantage in refrigeration system control. For example, I have found that excellent steady state and transient control of compressor suction superheat can be maintained using a control signal based upon a combination of sump temperature signal as modified by an outdoor air temperature signal. For the purposes of this specification, outdoor air temperature and ambient air temperature are used interchangeably. Thus, a suction superheat of 2 degrees to 5 degrees F. can be held over all operating conditions of the refrigeration system by utilizing the sump temperature/outdoor air temperature relationship described above. Control of the refrigeration system in this manner permits the system to employ a fully wetted evaporation coil, resulting in increased system operating capacity and high efficiency of operation.

Figure 5:
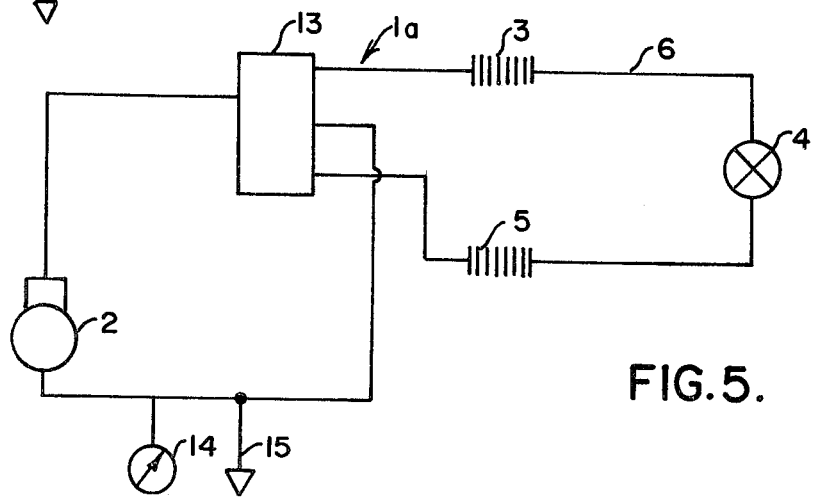
FIG. 5 is a diagrammatic illustration of the test system for obtaining the graphs of FIGS. 3 and 4.
Figure 3:
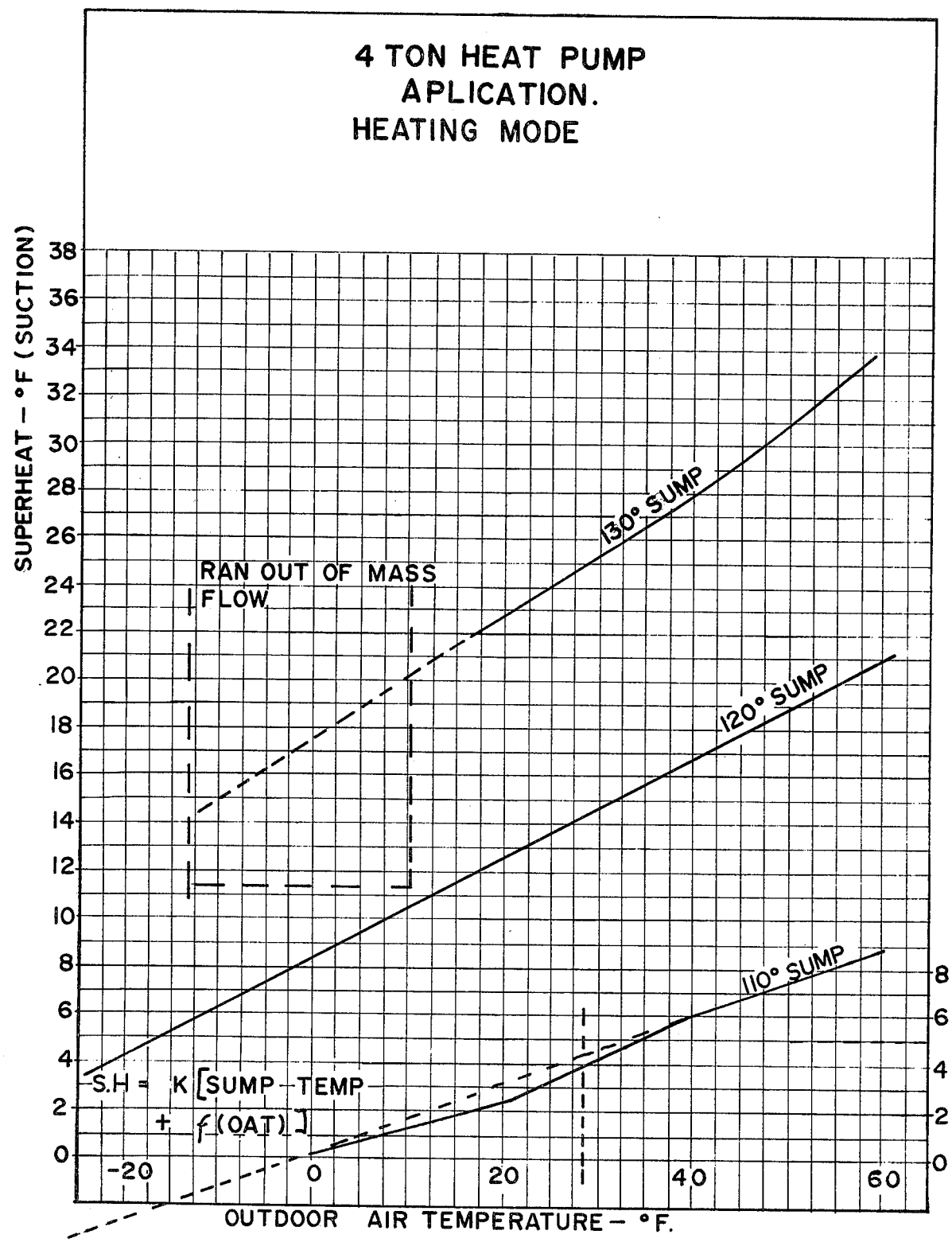
FIG. 3 is a graph illustrating the relationship between outdoor air temperature and refrigerant superheat on compressor sump temperature.

In order to establish the ambient air/sump temperature relationship emperically, a test unit was developed, that test unit being diagrammatically illustrated in FIG. 5, like numerals being used to described like components, where appropriate. FIG. 5 employs a four way reversing valve 13 of a conventional design in a heat pump configuration of the refrigeration system, denominated in that Figure by the reference numeral 1a. That is to say, the operational role of the coil 3 and the coil 5 may be reversed by the operation of the reversing valve so that the respective coils operate as condensers/evaporators, depending upon whether the valve is positioned in the heating or cooling mode of operation for the system 1a. The system 1a was developed to demonstrate the effectiveness of controlling suction superheat according to the formula: superheat (S.H.) = k (sump temperature) + f(oat), where k is a constant, and superheat and sump temperature are dependent upon some function of outdoor air temperature (oat). FIG. 3 illustrates the results obtained by monitoring sump temperature and degree of superheat. For a setting of 4 degrees F. superheat, the equation may be restated as: (S.H.)=0.036(sump temperature)+0.006(outdoor air temperature)− 0.2, expressed in degrees Fahrenheit. For values of sump temperature between 110 degrees and 120 degrees F., and outdoor air temperatures between −20 degrees and 40 degrees F., the last given equation will yield a 4 degrees superheat function at the suction side of the compressor. It is evident that the superheat setting can be adjusted by setting the constant value in the equation above. The data for FIG. 3 was obtained in a test utilizing the refrigeration system 1a of FIG. 5. Sump temperature and superheat in degrees Fahrenheit were measured by conventional gauges 14 and 15, respectively, while the ambient temperature of the compressor 2 and outdoor coil 5 was varied. FIG. 4 illustrates data obtained in the cooling mode of operation for the refrigeration system 1a.

Control of the refrigeration system 1 based on the data of FIGS. 3 and 4 can be obtained through a control means 16, best observed in FIG. 1. As there shown, a temperature sensor 17 is operatively connected to the sump of the compressor 2. Compressor 2 is a conventional hermetically sealed pump and motor combination mounted in a suitable shell or enclosure. The "sump" of the compressor refers to that area within the shell with which the line 6 from the evaporator coil 5 communicates. The sensor 17 developes a signal proportional to sump temperature, that signal forming an input to an operational amplifier 18. Operational amplifier 18 has an output 19 forming a first input to a differential amplifier 20.

A sensor 21 is positioned to sense outdoor air or ambient temperature. Sensor 21 developes a signal proportional to outdoor air temperature, that signal forming an input to an operational amplifier 22. An output 23 of the operational amplifier 22 provides a second input to differential amplifier 20. The sensors 17 and 21 are conventional and may comprise commercially available silicon diode sensors. Other sensor types are compatible with the broader aspects of this invention.

A potentiometer 24 provides a signal representing a desired superheat setting as a first input to an operational amplifier 25. A constant generator means 26 also provides an input to the amplifier 25. Constant generator means 26 is conventional, and may comprise any suitable voltage source for providing a desired voltage input to the amplifier 25. It will be apparent to those skilled in the art that the constant generator means 26 can be combined with the superheat setting signal obtained from the potentiometer 24, if desired. An output 27 of the amplifier 25 forms a third input to differential amplifier 20.

Differential amplifier 20 has an output 28 which forms an input to an amplifier 29. Amplifier 29 amplifies the signal from the differential amplifier 20. An output 30 of the amplifier 29 is an input to a power amplifier 31, which again amplifies the signal input. The amplifier 31 has an output 32 operatively connected to the heater means 11 of the valve 4.

A feedback loop 33 is operatively connected between the heater means 11 and the input side of the amplifier 31. The feedback loop 33 functions to limit power input to the heating means in a conventional manner.

Figure 2:
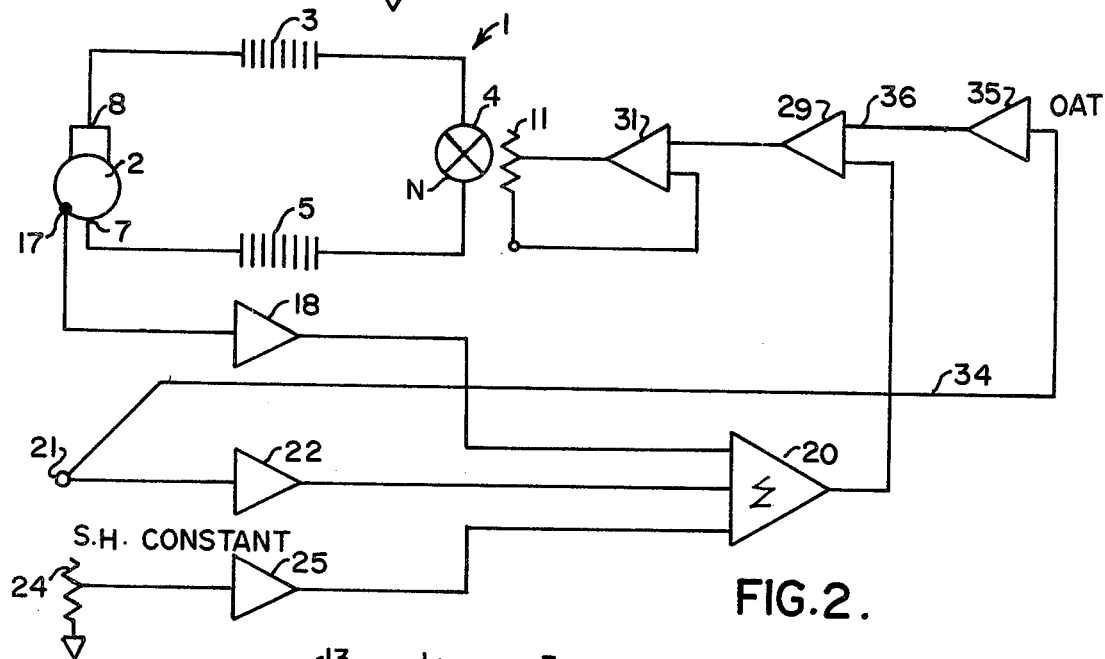
FIG. 2 is a diagrammatic view showing a second illustrative embodiment of control system of this invention.

I have further found that the operation of the control system 16 can be improved in certain embodiments by permitting the outdoor air temperature sensor signal to overcompensate the valve 4 setting. Since the outdoor air temperature affects system load, the expansion valve operating position or range will change accordingly. By rebiasing the valve positions based upon a function of outdoor air temperature, the overall gain of the control system 16 can be reduced to result in better system stability. Conversely, the gain of the control system 16 can be kept the same and the compensation offered by rebiasing the valve position as a function of outdoor air temperature will result in a more precise control of superheat. This variation is illustrated in FIG. 2. Like numerals are used for like components, where appropriate. FIG. 2 is essentially similar to FIG. 1, except that the superheat and constant signal is shown as a combined signal from the potentiometer 24. Further, in this embodiment the sensor 21 feeds the outdoor air signal developed thereby both to the amplifier 22 and to an amplifier 35 along a conductor 34. Amplifier 35 has an output 36 forming a second input to the amplifier 29. Operation of the remaining circuit components are essentially as described in conjunction with FIG. 1.

Numerous variations, within the scope of the appended claims, will be apparent to those skilled in the art in light of the foregoing description and accompanying drawings. Thus, various components indicated as preferred may be changed in other embodiments of this invention. While the valve described in Kunz U.S. Pat. No. 3,967,781, is well suited for use in conjunction with this invention, other valve types are compatible with the broader aspects of the invention. As indicated above, the terms outdoor and ambient air temperature are used interchangeably. Those skilled in the art will recognize that "ambient" need not be "outdoor". That is to say, for the purposes of this specification, both terms are meant to refer to the air temperature affecting compressor and/or evaporator/condenser operation. These variations are merely illustrative.

Having thus described the invention, what is claimed and desired to be secured by Letters Patent is:

1. In a refrigeration system including a compressor, a first coil operatively connected to said compressor, a second coil operatively connected to said first coil and to said compressor, and an electrically operable expansion valve connected between said first and said second coils, said expansion valve including electrically energizable means for controlling the position of said valve, the improvement which comprises means for controlling the electrical input to said electrically operable expansion valve, said control means including means for sensing the sump temperature of said compressor, means for sensing the ambient air temperature affecting said compressor, and means, responsive to said ambient air and sump temperature sensing means for regulating the electrical input to said electrically energizable means.

2. The improvement of claim 1 including constant generating means for selecting a predetermined superheat setting for system operation.

3. The improvement of claim 2 wherein said controlling means includes summing means having three inputs and one output, one of said inputs being connected to said sump temperature sensing means, a second one of said inputs being connected to said ambient air temperature sensing means, and a third one of said inputs being connected to said superheat signal generating means, and an amplifier means having an input electrically connected to the output of said summing means.

4. The improvement of claim 3 wherein said amplifier means includes at least first and second stages, the first stage of said amplifier having its input electrically connected to the output of said summing means, the second stage of said amplifier means having an output connected to said electrically operated valve, and feedback loop means between said electrically operable means and an input side of the second stage of said amplifier means.

5. The improvement of claim 4 further including means for inserting the outdoor air temperature signal directly to the first stage of said amplifier means.

6. A refrigeration system and control therefor, comprising:
   a compressor including a sump;
   a first coil operatively connected to said compressor;
   a second coil operatively connected to said compressor;
   an electrically operable expansion valve between said first and said second coils, said expansion valve including electrically energizable means for controlling the position of said valve;
   means for sensing the temperature at the sump of said compressor;
   means for sensing the temperature of the ambient air; and
   means responsive to a signal generated by said sump and said ambient temperature sensing means for controlling the electrical input to said electrically operable expansion valve.

7. A system and control means therefor, comprising:
   a compressor including a sump;
   a first coil operatively connected to said compressor;
   a second coil operatively connected to said compressor;
   an electrically operable expansion valve connected between said first and said second coils, said expansion valve including electrically energizable means for controlling position of said valve; and
   control means for controlling the electrical input to the electrically energizable means of said expansion valve, said control means including summing means having at least two inputs and one output, first temperature sensor means connected between the sump of said compressor and said first input, second temperature sensor means connected between the ambient surroundings of said compressor and said second input, and amplifier means electrically connected between the output of said summing means and the electrically energizable means of said expansion valve.

8. The system of claim 7 wherein said summing means has three inputs, further including means for generating a constant signal representation of a desired superheat setting, said superheat setting means being operatively connected to the third input of said summing means.

9. The system of claim 8 wherein said amplifier means includes at least first stage and a second stage, the first stage of said amplifier having its input electrically connected to the output of said summing means, the second stage of said amplifier means having an output connected to said electrically operated valve, and feedback loop means between said electrically operable means and an input side of the second stage of said amplifier means.

10. The system of claim 9 further including means for inserting the outdoor air temperature signal directly to the first stage of said amplifier means.

* * * * *

UNITED STATES PATENT AND TRADEMARK OFFICE
CERTIFICATE OF CORRECTION

PATENT NO. : 4,244,182

DATED : January 13, 1981

INVENTOR(S) : Joseph L. Behr

It is certified that error appears in the above—identified patent and that said Letters Patent is hereby corrected as shown below:

Column 5, line 9, "condensers-" should be "condensers".

Column 5, line 21, "+0.00-" should be "+0.006".

Column 5, line 22, "6(" should be "(".

Signed and Sealed this

Twenty-ninth Day of September 1981

[SEAL]

Attest:

GERALD J. MOSSINGHOFF

Attesting Officer    Commissioner of Patents and Trademarks